(12) United States Patent
Baldwin et al.

(10) Patent No.: US 8,073,799 B2
(45) Date of Patent: Dec. 6, 2011

(54) METHOD FOR GENERATING DESIGN REQUIREMENTS INFORMATION TECHNOLOGY DEVELOPMENT PROJECTS

(75) Inventors: Ronald B. Baldwin, Birmingham, AL (US); Sandy A. Brasher, Birmingham, AL (US)

(73) Assignee: Facilitaire, Inc., Birmingham, AL (US)

( * ) Notice: Subject to any disclaimer, the term of this patent is extended or adjusted under 35 U.S.C. 154(b) by 835 days.

(21) Appl. No.: 12/100,612

(22) Filed: Apr. 10, 2008

(65) Prior Publication Data

US 2009/0259682 A1    Oct. 15, 2009

(51) Int. Cl.
*G06F 17/00* (2006.01)
*G06N 5/02* (2006.01)

(52) U.S. Cl. ........................................... 706/46
(58) Field of Classification Search ............... 706/53
See application file for complete search history.

(56) References Cited

U.S. PATENT DOCUMENTS

| | | | |
|---|---|---|---|
| 5,745,878 A | 4/1998 | Hashimoto et al. | |
| 6,014,637 A | 1/2000 | Fell et al. | |
| 6,493,693 B1 | 12/2002 | Hill | |
| 6,968,343 B2 | 11/2005 | Charisius et al. | |
| 7,035,809 B2 | 4/2006 | Miller et al. | |
| 2002/0194147 A1* | 12/2002 | Ricke | 706/53 |
| 2004/0024622 A1 | 2/2004 | Knight | |
| 2006/0117012 A1 | 6/2006 | Rizzolo et al. | |
| 2007/0168874 A1* | 7/2007 | Kloeffer et al. | 715/764 |

OTHER PUBLICATIONS

'The ORDIT approach to requirements identification': Dobson, 1992, IEEE, 0730-3157/92, pp. 356-361.*
'Organisational requirements definition for information technology systems': Dobson, IEEE, 1994, 0-8186-5480-5/94, pp. 158-165.*
'An object oriented framework for enterprise modelling': Menga, IEEE, 1994, 0-7803-1993-1/94, pp. 1879-1886.*

* cited by examiner

*Primary Examiner* — Omar Fernandez Rivas
*Assistant Examiner* — Peter Coughlan
(74) *Attorney, Agent, or Firm* — David E. Mixon; Bradley Arant Boult Cummings LLP

(57) ABSTRACT

A method for generating design requirements for has been developed. First, a framework is created for decomposing and categorizing organizational information into data elements that are stored in a data repository. A relationship is defined between the data elements and corresponding project information that is stored in the data repository. Next, a guided facilitation process is used to elicit objective information from the end-user regarding objectives for new technology. The requirements for the project are determined from the end-user based upon the specification information. This continues until informational needs have been specified and mapped with the corresponding data elements. Finally, a standards requirement document is generated and periodically updated using the mapped data elements from the data repository.

6 Claims, 4 Drawing Sheets

METHOD FOR GENERATING DESIGN REQUIREMENTS INFORMATION TECHNOLOGY DEVELOPMENT PROJECTS

FIELD OF THE INVENTION

The invention relates generally to computer software. More specifically, the invention relates to computer software for identifying requirements for designing information technology systems.

BACKGROUND ART

Information Technology (IT) systems are of critical importance to businesses and other organizations. It is common to spend large amounts of money and time in designing, developing and upgrading IT systems. One of the first set of activities leading to the development of IT systems includes specifying the requirements that must be fulfilled by the system.

One example of the process for accomplishing this task includes end users using word processing software to provide descriptions to IT personnel of their perceived requirements as text narratives. In another method, end users utilize Requirements Management systems to provide text narratives, or append other documents that are made available to IT personnel for design activities. In still other methods, users and IT personnel work in facilitated sessions to collaborate in describing requirements for system design activities. Most often the outputs of these sessions are text narratives created in word processing systems, as well as simple graphical representations often referred to as Use Cases that describe requirements of the Users. Finally, IT personnel may simply work on system design and development activities without explicit requirements provided by users.

Each of these methods has various inefficiencies as well as the potential for miscommunication for the system requirements. Consequently, a method for efficiently identifying requirements for an information technology system is needed.

SUMMARY OF THE INVENTION

In some aspects, the invention relates to a method for generating specification requirements for Information Technology development, comprising: creating a framework for decomposing and categorizing organizational information into data elements that comprise requirements; storing the data elements in a data repository; associating information provided by an end-user with the corresponding data elements to create a defined relationship; storing the defined relationship in the data repository; eliciting objective information from the end-user regarding objectives for new technology as a response to a guided facilitation process; eliciting specification information from the end-user based upon the objective information; eliciting requirement information from the end-user based upon the specification information until informational needs pertinent to various types and categories of requirements have been specified; mapping data elements in the data repository with the corresponding informational needs; generating standard requirements documents using the mapped data elements from the data repository; and periodically updating additional standard requirements documents using mapped data elements in the data repository.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
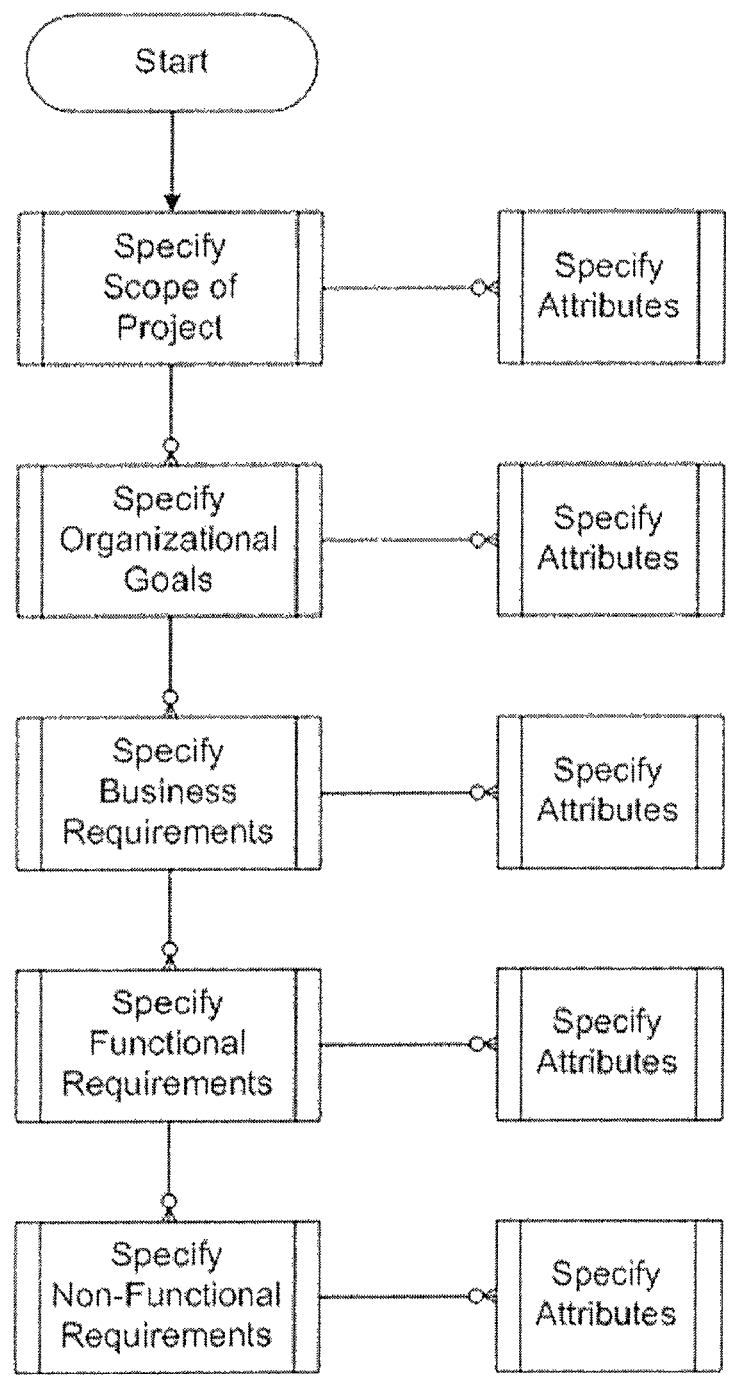
FIG. 1 shows a process diagram of the process of identifying requirements in accordance with one embodiment of the present invention.

A method for facilitating the specification of an organization's requirements for information technology systems has been developed. The method is commonly called a requirements facilitation system (RFS). The purpose of the RFS is to directly assist end users in the elicitation and specification of requirements for software development activities. The RFS goes beyond providing a template or form for input of narrative descriptions.

End-users often have little experience with writing requirements for IT initiatives. The RFS provides a method whereby the end-user is not required to have expertise in domains other than those specific to the end-user's routine work responsibilities.

RFS is a method that improves the generation of a specification of requirements needed by IT organizations for developing software applications. Examples of such requirements include information regarding the objectives of the organization that must be supported by technology, as well as the functional and quality attributes that must be satisfied by the needed technology. RFS facilitates the work of the end-user in specifying requirements corresponding to the preceding examples as well as other requirements known to one of skill in the art. The advantage of using RFS is an easier creation of a specification of an organization's requirements suitable for use in software development life cycle (SDLC) activities of IT organizations.

RFS is a method that is applicable for use in multiple industries. RFS provides a method that make the specification of requirements the prerogative of managers external of the IT organization (also known as "end-users"). RFS can be integrated into organizations that use team-oriented facilitation approaches where end-users and IT managers collaborate on the specification of requirements. RFS supports extraction of detailed requirements for migration into other systems designed for SDLC management such as requirements management (RM) systems. Use of RFS in conjunction with a RM system, establishes stronger audit trails and controls over software changes.

The RFS method of the present invention relies upon approaches of decomposition and categorization of the requirements of the organization for new technology. The method is constructed such that end-users are guided into specifying information that is increasingly specific and detailed while remaining pertinent to the informational needs of the IT organization for SDLC efforts.

Through decomposition and categorization, RFS establishes major groups and sub-groups of requirements as they pertain to the informational needs of the IT organization for SDLC activities. The method of the present invention begins with the categorization that defines a project as a short-term work initiative that has a specific scope and limited duration. Within the organizational parameters that define a project, information about the organization's needs for new technology is organized into specific groups and sub-groups of requirements.

RFS guides end-users to provide information in discreet choices such as, but not limited to, "Yes or No", and "Option 1, Option 2 or Option 3". In addition, the RFS guides end-users in providing detailed information about successively more specific sub-categories. This guided facilitation process may be presented to the user of the RFS through a graphical user interface (GUI) for ease of use.

FIG. 1 shows an embodiment of the RFS method in a diagram starting with a project and decomposing and categorizing the project into the goals of the organization as pertains to the project. These results are further decomposed and categorized into business requirements. As additionally shown in FIG. 1, business requirements are further decomposed and categorized into functional requirements. Lastly, functional requirements are decomposed and categorized into non-functional requirements.

Also, the RFS method as represented in FIG. 1 guides the end-user to specify detailed information pertaining to attributes corresponding to the different categories of requirements. The method includes use of relevant attributes for each category of requirements in the RFS. Attributes in RFS correspond to informational needs of IT that are pertinent to the specific category or sub-category previously selected by the end-user.

Figure 2:
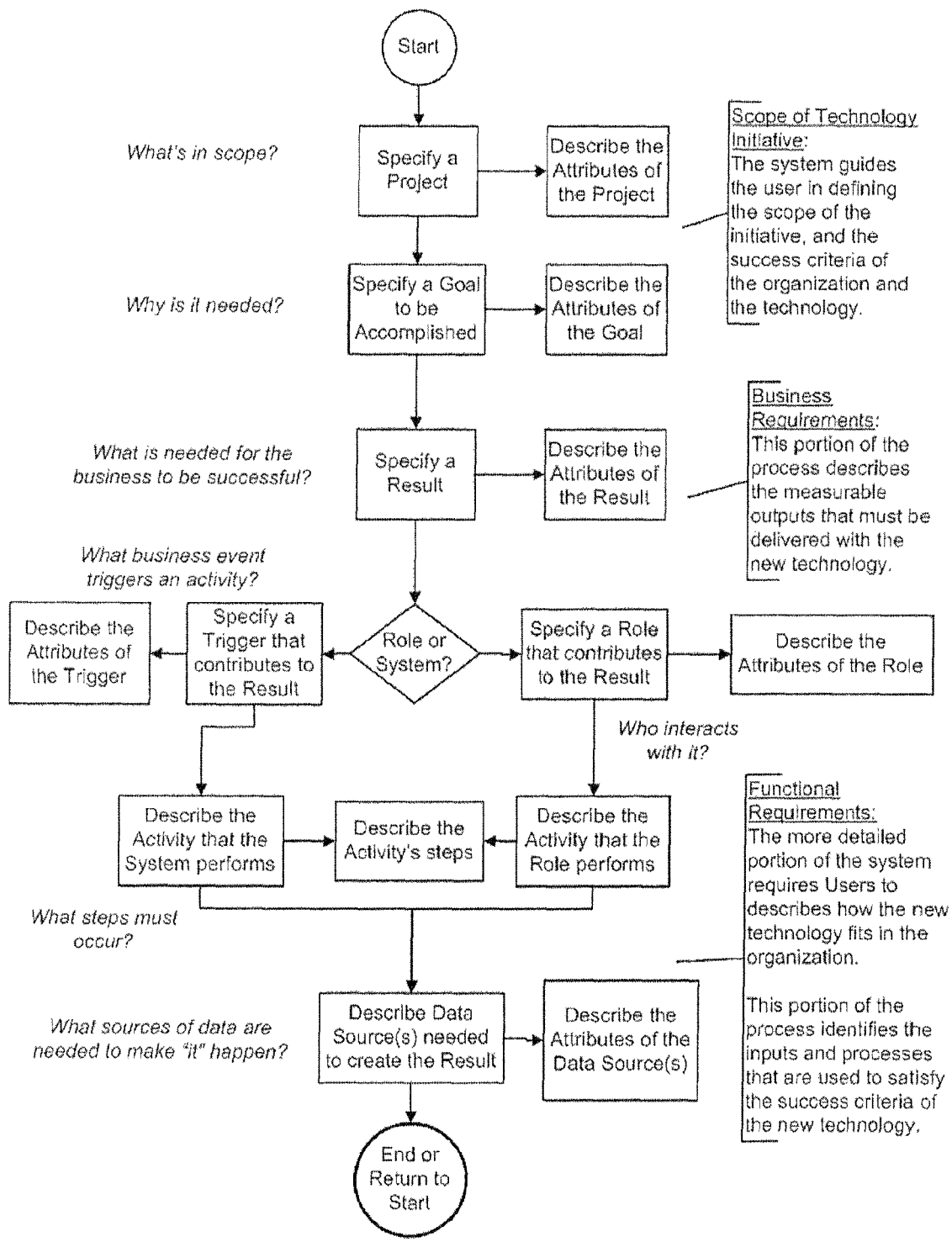
FIG. 2 shows an example of a high level process diagram for designing an IT system for an organizational user in accordance with one embodiment of the present invention.

FIG. 2 shows one embodiment of the RFS that emphasizes the manner in which the needs of the organization for new technology fit into its existing or future-state operations. FIG. 2 starts with the inception of a project as occurs from the organization's management. At the beginning of the process, the scope of the project is specified including the organizational purpose for the initiative.

Using the scope and attributes of the project as informational inputs, the end-user is guided by the RFS method in specifying the details related to the goals of the organization as pertains to the project. The RFS elicits from the end-user details about the goals of the project corresponding to attributes that are pertinent to the informational needs of IT. In the embodiment of the RFS as shown in FIG. 2, upon completion of decomposing and categorizing the project into its requisite goals, the IT organization will have detailed information from the end-user regarding why new technology is needed.

Figure 3:
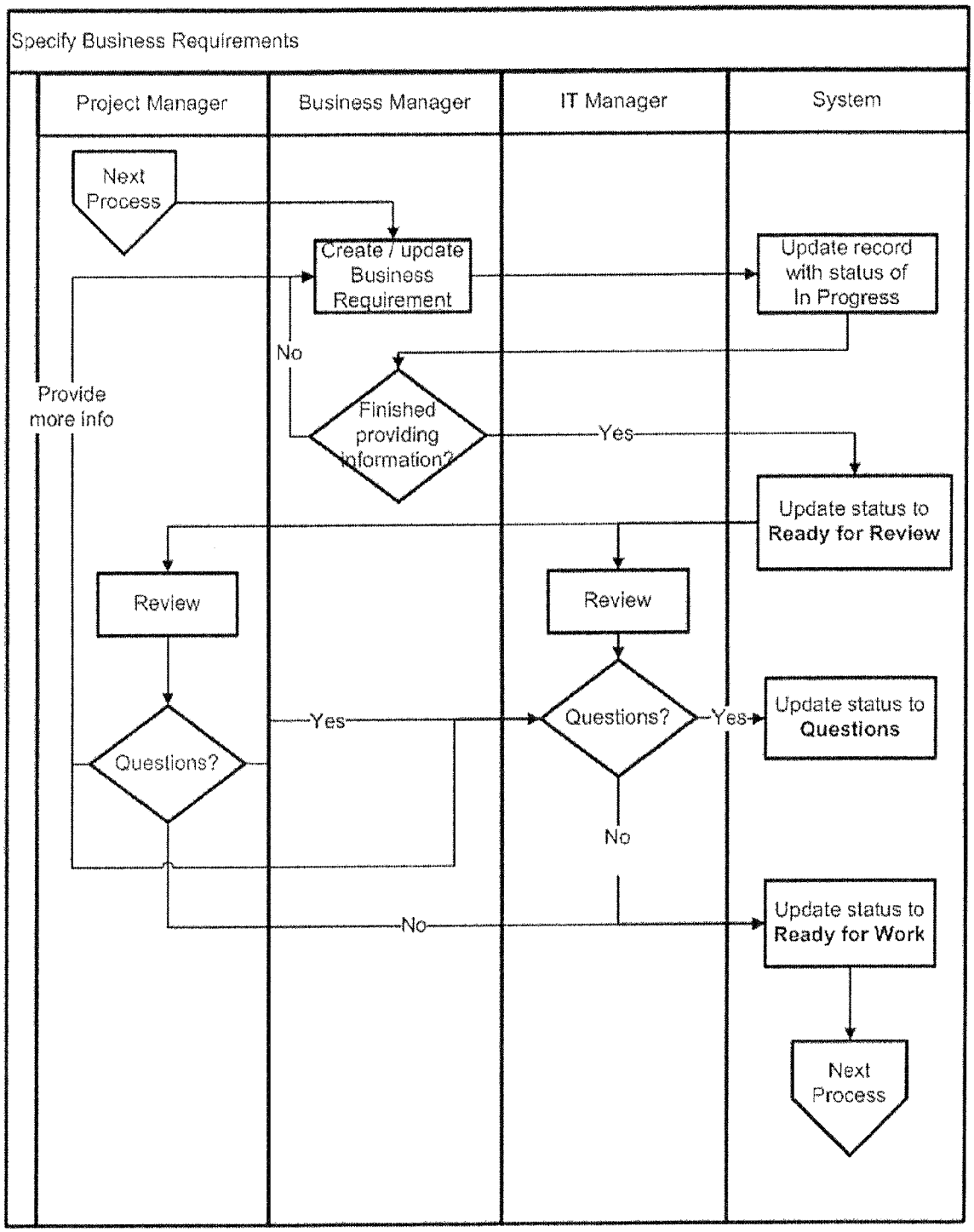
FIG. 3 shows an example of a flow chart creating and updating organizational requirements for the process shown previously in FIG. 2.

Based on the information provided by the end-user regarding the goals of the project, the RFS guides the end-user in specifying the needs of the organization so that it will successfully meets its operational objectives. These needs are expressed as business requirements, and are a further specification and refinement of information needed by the IT organization for SDLC activities. The business requirements are developed by specifying and describing the desired results of the project, as specifically related to the technology that IT must deliver. FIG. 3 shows an example of a cross-functional flow chart creating and updating business requirements for the process shown previously in FIG. 2.

Following the specification of the pertinent business requirements by the end-user, the RFS facilitates the specification of how the new technology will be integrated into the operational activities of the organization. As shown in FIG. 2, this operational integration specifies the functional requirements that the new technology must support in order for the organization to be successful in achieving its business requirements.

Figure 4:
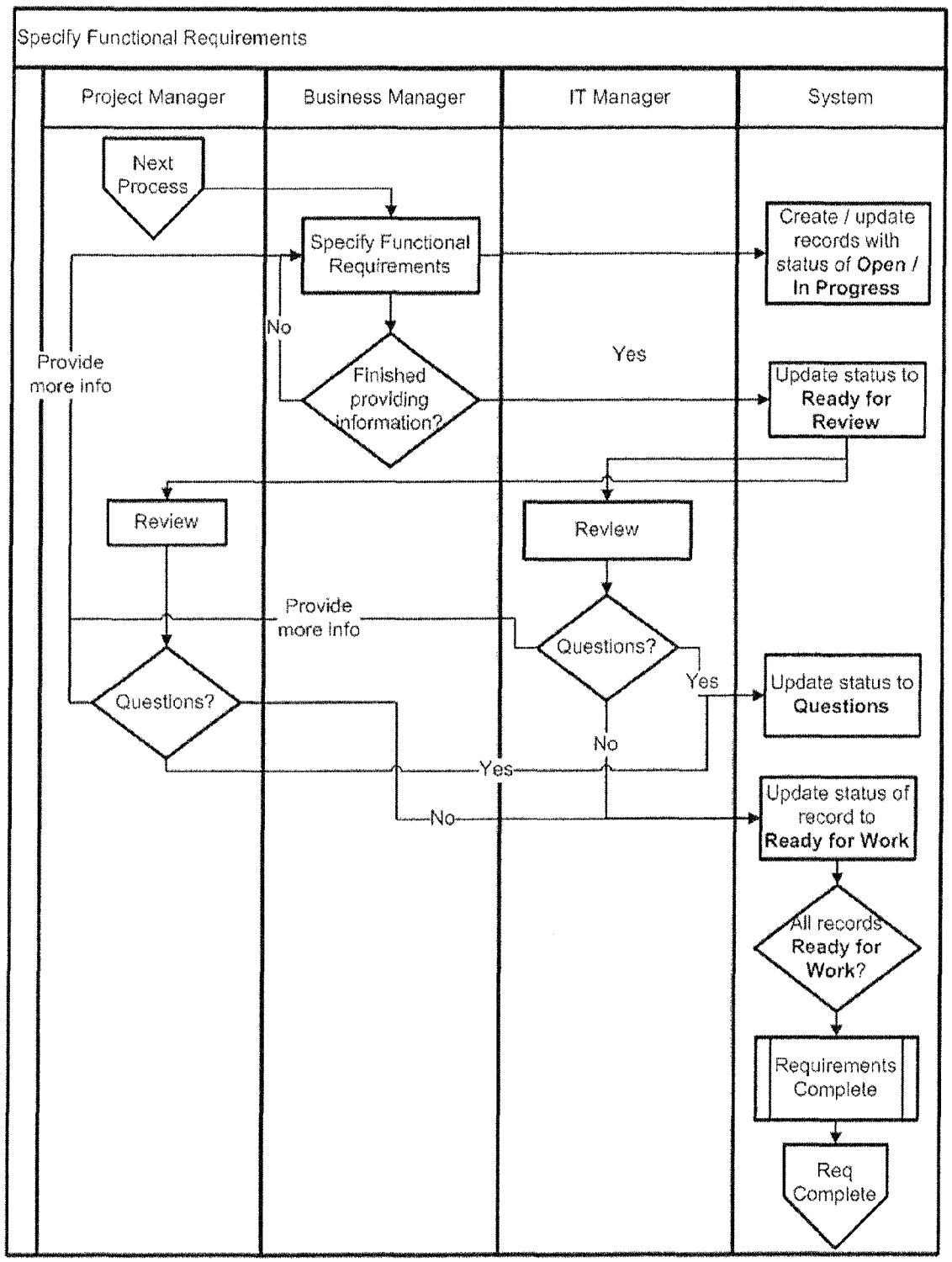
FIG. 4 shows an example of a flow chart creating and updating functional requirements for the process shown previously in FIG. 2.

In the specification of the functional requirements, the RFS elicits information from the end-user on multiple aspects of the organization's operation. The functional requirements are inclusive of operational processes, initiating or trigger events within the operational processes, operational roles, as well as types and sources of informational inputs. Functional requirements are developed by specifying and describing: business events that trigger a targeted activity; the roles of the involved parties; the necessary actions of the involved parties; and the data requirements of the involved parties. FIG. 4 shows an example of a cross-functional flow chart creating and updating functional requirements for the process shown previously in FIG. 2.

The embodiment of RFS as shown in FIG. 1 continues the method into the specification of non-functional requirements, also known by those skilled in the art as "quality requirements". While the embodiment of the RFS method shown in FIG. 2 specifies that the process stops and then may repeat the method after the specification of functional requirements. The omission of the specification of non-functional requirements shown in FIG. 2 is a limit of that particular embodiment and not the RFS as a whole.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for generating design requirements for information technology development projects, comprising:
   creating a framework for decomposing and categorizing organizational information into data elements that comprise requirements;
   storing the data elements in a data repository;
   associating information provided by an end-user with the corresponding data elements to create a defined relationship;
   storing the defined relationship in the data repository;
   eliciting objective information from the end-user regarding objectives for new technology as a response to a guided facilitation process;
   eliciting specification information from the end-user based upon the objective information;
   eliciting requirement information from the end-user based upon the specification information until informational needs pertinent to various types and categories of requirements have been specified;
   mapping data elements in the data repository with the corresponding informational needs;
   generating standard requirements documents using the mapped data elements from the data repository; and periodically updating additional standard requirements documents using mapped data elements in the data repository.

2. The method of claim 1, where the information in the data repository is presented as graphical representations of an organization's requirements.

3. The method of claim 2, where the presented information in the data repository is configured as an input to a requirement management software system.

4. The method of claim 1, where the data elements stored in the data repository are updated periodically.

5. The method of claim 4, where the data elements are updated by a manual input.

6. The method of claim 4, where the data elements are updated by an automatic feed.

* * * * *